US006330334B1

(12) United States Patent
Ryan

(10) Patent No.: US 6,330,334 B1
(45) Date of Patent: Dec. 11, 2001

(54) METHOD AND SYSTEM FOR INFORMATION DISSEMINATION USING TELEVISION SIGNALS

(75) Inventor: John O. Ryan, Woodside, CA (US)

(73) Assignee: Command Audio Corporation, Redwood City, CA (US)

( * ) Notice: Subject to any disclaimer, the term of this patent is extended or adjusted under 35 U.S.C. 154(b) by 0 days.

(21) Appl. No.: 09/625,908

(22) Filed: Jul. 26, 2000

Related U.S. Application Data

(63) Continuation of application No. 08/977,846, filed on Nov. 25, 1997, which is a continuation of application No. 08/769,092, filed on Dec. 18, 1996, now Pat. No. 5,751,806, which is a division of application No. 08/181,394, filed on Jan. 12, 1994, now Pat. No. 5,590,195, which is a continuation-in-part of application No. 08/031,763, filed on Mar. 15, 1993, now Pat. No. 5,406,626.

(51) Int. Cl.[7] ................................ H04L 9/00; H04B 1/06
(52) U.S. Cl. ...................... 380/237; 380/241; 380/269; 380/270; 380/281; 455/45
(58) Field of Search .................................. 380/237, 241, 380/269, 270, 281; 455/39, 42, 45; 704/275; 705/35, 51

(56) References Cited

U.S. PATENT DOCUMENTS

| 3,718,767 | 2/1973 | Ellis . |
| 4,052,719 | 10/1977 | Hutt et al. . |
| 4,247,908 | 1/1981 | Lockhart et al. . |

(List continued on next page.)

FOREIGN PATENT DOCUMENTS

| 39 38 457 A1 | 11/1989 | (DE) . |
| 4024132 | 2/1992 | (DE) . |
| 42 22 777 A1 | 7/1992 | (DE) . |

(List continued on next page.)

OTHER PUBLICATIONS

Dr. Matjaz Debevc, "Kabelski dostop do omerzja Internet" from the proceedings of a seminar on telecommunications entitled "Digitalni Izziv Na Podrocju Radia In Televizije"; May, 1996; Maribor, Slovenia.*

(List continued on next page.)

*Primary Examiner*—Bernarr E. Gregory
(74) *Attorney, Agent, or Firm*—Skjerven Morrill MacPherson LLP; Norman R. Klivans; Christopher B. Allenby

(57) ABSTRACT

A system and method of information dissemination that permits the user to listen to the specific content of information when and where he or she wants to. A radio or television receiver system receives information from an FM subcarrier, a television vertical blanking interval transmission, a television separate audio program transmission or a dedicated channel and stores the transmitted information in a memory. A user interface allows selection from the memory of the stored information via a set of menus controlling a hierarchical database, so as to access particular items of information. Typically the system includes RAM and/or a storage medium such as a digital audio tape, a magneto-optical mini-disk, a magnetic disk or optical disk, sufficient to store information for 10 hours of audio. A decompression device, accepts the accessed compressed digital audio information items which may have been encrypted and transforms them into spoken speech. The user interface is either by voice or a single or multi-position switch allowing scanning through and selection from the menu items. The signal for such a device is generated by converting analog audio signals into a digital audio data stream which may be encrypted. The encrypted digital data stream is compressed and inserted onto the radio or television carrier via an FM Subcarrier, the television vertical interval or the separate audio program channel of a television transmitter. The system is also capable of transmitting alphanumeric data and converting this alphanumeric to a voice form using a speech synthesizer.

48 Claims, 2 Drawing Sheets

U.S. PATENT DOCUMENTS

| | | |
|---|---|---|
| 4,266,243 | 5/1981 | Shutterly . |
| 4,308,558 | 12/1981 | Hernandez et al. . |
| 4,323,921 | 4/1982 | Guillou . |
| 4,331,837 | 5/1982 | Soumagne . |
| 4,377,822 | 3/1983 | Noirel et al. . |
| 4,393,277 | 7/1983 | Besen et al. . |
| 4,430,525 | 2/1984 | Franz et al. . |
| 4,450,477 | 5/1984 | Lovett . |
| 4,473,824 | 9/1984 | Claytor . |
| 4,476,559 | 10/1984 | Brolin et al. . |
| 4,608,456 | 8/1986 | Paik et al. . |
| 4,677,552 | 6/1987 | Sibley, Jr. . |
| 4,680,629 | 7/1987 | Fukushima et al. . |
| 4,682,368 | 7/1987 | Takahashi . |
| 4,683,586 | 7/1987 | Sakamoto et al. . |
| 4,752,953 | 6/1988 | Paik et al. . |
| 4,788,543 | 11/1988 | Rubin . |
| 4,807,276 | 2/1989 | Okabe . |
| 4,809,271 | 2/1989 | Kondo et al. . |
| 4,852,086 | 7/1989 | Eastmond et al. . |
| 4,868,866 | 9/1989 | Williams, Jr. . |
| 4,907,159 | 3/1990 | Mauge et al. . |
| 4,916,742 | 4/1990 | Kolesnikov et al. . |
| 4,942,616 | 7/1990 | Linstroth et al. . |
| 5,010,499 | 4/1991 | Yee . |
| 5,023,905 | 6/1991 | Wells et al. . |
| 5,027,400 | 6/1991 | Baji et al. . |
| 5,036,394 | 7/1991 | Morii et al. . |
| 5,042,070 | 8/1991 | Linna et al. . |
| 5,086,510 | 2/1992 | Guenther et al. . |
| 5,121,391 | 6/1992 | Paneth et al. . |
| 5,121,476 | 6/1992 | Yee . |
| 5,131,020 | 7/1992 | Liebeany et al. . |
| 5,133,010 | 7/1992 | Borth et al. . |
| 5,146,473 | 9/1992 | Critchlow et al. . |
| 5,146,612 | 9/1992 | Grosjean et al. . |
| 5,152,011 | 9/1992 | Schwob . |
| 5,177,685 | 1/1993 | Davis et al. . |
| 5,182,555 | 1/1993 | Sumner . |
| 5,206,641 | 4/1993 | Grant et al. . |
| 5,210,611 | 5/1993 | Yee et al. . |
| 5,233,423 | 8/1993 | Jernigan et al. . |
| 5,239,700 | 8/1993 | Guenther et al. . |
| 5,295,154 | 3/1994 | Meier et al. . |
| 5,406,626 * | 4/1995 | Ryan .................................... 705/51 |
| 5,444,312 | 8/1995 | Noblett et al. . |
| 5,452,289 | 9/1995 | Sharma et al. . |
| 5,467,087 | 11/1995 | Chu . |
| 5,524,051 * | 6/1996 | Ryan .................................... 380/237 |
| 5,590,195 * | 12/1996 | Ryan .................................... 380/237 |
| 5,600,573 | 2/1997 | Hendricks et al. . |
| 5,659,877 | 8/1997 | Enomoto et al. . |
| 5,751,806 * | 5/1998 | Ryan .................................... 380/237 |

FOREIGN PATENT DOCUMENTS

| | | |
|---|---|---|
| 0128093 | 12/1984 | (EP) . |
| 0 279 451 A2 | 8/1988 | (EP) . |
| 0373386 | 6/1990 | (EP) . |
| 0552051 | 7/1993 | (EP) . |
| 0 429 000 | 3/1996 | (EP) . |
| 2651352 | 3/1991 | (FR) . |
| 2 259 204 A | 3/1993 | (GB) . |
| 58-92161 | 6/1983 | (JP) . |
| 61-257037 | 11/1986 | (JP) . |
| 61-269436 | 11/1986 | (JP) . |
| 62-235835 | 10/1987 | (JP) . |
| 2-105195 | 4/1990 | (JP) . |
| WO/8704309 | 7/1987 | (WO) . |
| WO/8901429 | 2/1989 | (WO) . |
| WO 92/10040 | 6/1992 | (WO) . |

OTHER PUBLICATIONS

Jesica L. Kemp, "Cable Modem Impact on Service"; Paper IFSM 652C.0102; University of Maryland Baltimore County; Dec. 10, 1996.*

D. Kumin, "RBDS Radios on the Way, But Most Suppliers Cautious", *Twice 4,* Jan. 1993, p. 9.

M. Fleischmann, "Now it's digital FM radio. (The Digital Age Comes Home)", *Popular Science,* Nov. 1990, v 237, n5, p 77 (3).

P. Rocheleau, *Radio on Wheels,* (book reviews), Consumers Union of the U.S., 1991; first three paragraphs only.

R. Lockwood, "FM sidebands: tuning in to Wall Street", *Personal Computing,* Apr. 27, 1990, v14, n4, p. 80.

P. Davies, "The Radio System—Traffic Channel," in *IEEE 1989,* pp. A–44–A–48.

G. Siegel, "Traffic Message Channel" in *RFE* 12–92, pp. 803–806 (translation provided).

TLH:Home Automation for the Hobbyist, "Prelimnary Product Information: Video Text Overlay Module" (Http://www.tlha.com/html/video_text.html) (Feb. 28, 2001).

Mante: Manchester Telematics Explained, "Teletex" (Http://www.poptel.org.uk/mante/glossary/g159.htm) (Feb. 28, 2001).

"Teletex" Http;//www.its.bldrdoc.gov/projects/tlglossary2000/_teletex.html (Feb. 28, 2001).

Saunders, John, "Real–Time Discrimination of Broadcast Speech/Music," Proceedings of ICASSP, IEEE (1996) pp. 993–996.

"Macrovision Decoder/Blanker," Elektor Electonics, vol. 14, No. 160 (Oct. 1988) Canterbury, GB, pp. 44–47, XP4613.

Saunders, John, "Real–Time Discrimination of Broadcast Speech/Music," Proceedings of ICASSP, IEEE (1996) pp. 993–996.

"Macrovision Decoder/Blanker," Elektor Electronics, vol. 14, No. 160 (Oct. 1988) Canterbury, GB, pp. 44–47, XP4613.

* cited by examiner

METHOD AND SYSTEM FOR INFORMATION DISSEMINATION USING TELEVISION SIGNALS

CROSS-REFERENCE TO RELATED APPLICATIONS

This application is a continuation of application Ser. No. 08/977,846, filed Nov. 25, 1997, which is a continuation of application Ser. No. 08/769,092, filed Dec. 18, 1996, now issued as U.S. Pat. No. 5,751,806, which is a division of application Ser. No. 08/181,394, filed Jan. 12, 1994 now issued as U.S. Pat. No. 5,590,195, which is a continuation-in-part of application Ser. No. 08/031,763, filed Mar. 15, 1993, now issued as U.S. Pat. No. 5,406,626.

BACKGROUND

This invention relates to a radio or television broadcasting system for transmission of audio information to a specially adapted receiver which converts the selected transmitted audio information to a form usable by the user.

Numerous systems transmit information on FM radio subcarriers. See for instance, U.S. Pat. No. 5,152,011 issued to Schwob, Sep. 29, 1992. Also known is a single sideband communication system with FM data capability for transmission of analog voice signals. See U.S. Pat. No. 4,852,086 issued to Eastmond et al., Jul. 20, 1989.

Also known is FM radio sideband broadcasting to specially adapted computers for transmission for instance of news and financial information. Commercially available products available from Mainstream, Telemet, and DeskTop Data broadcast data over FM radio sidebands for receipt by personal computers equipped with special FM radio receivers and software. Typically information is transmitted in digital form, received, and stored in the computer memory for access by the computer user using menu driven software. The data is displayed on the computer screen in conventional alphanumeric form. One product in this category is News Edge, a news service available from DeskTop Data, Inc. of Waltham, Massachusetts which delivers a number of news and financial information services to a user via FM radio sideband. Software provided with the product scans incoming information and when the incoming information meets parameters set by the user, the information is saved to disk and/or displayed on the computer screen.

These systems have the disadvantage of requiring a personal computer as a platform, and providing information only on a computer screen. The usual computer skills are needed in order to operate such systems, which tend to be quite expensive.

Data can also be transmitted in the Vertical Blanking Interval of a TV transmission. The Federal Communications Commission has set aside several lines of the Vertical Blanking Interval for point to multipoint data transmission which may be sold to interested users.

An additional channel of communication for data or audio transmission is the Separate Audio Program channel available in television broadcasting.

All of these systems have disadvantage that the listener or user of the data must be tied down to a specific place or time to hear the information. The portable radio, be it hand held or in an automobile also limits the user to getting only the information that is presently being transmitted.

SUMMARY

The system and method described below permits the user to listen to the specific content of information when and where he or she wants to. The present invention is directed to a method and system for information dissemination using various modes of transmission that satisfy the needs of such a user. The invention includes a system for receiving information via a tuner that extracts digitized alphanumeric data or compressed audio data from the Vertical Blanking Interval of a television station's video signal, the Separate Audio Program (SAP) signal from a television station's audio signal or a system for receiving the digitized alphanumeric data or compressed audio information via radio sidebands (subcarriers) which includes an FM subcarrier of an FM broadcast signal. In addition, a suitable dedicated transmission facility could be used. Conditional access circuitry decrypts the previously encrypted digitized alphanumeric data or compressed audio data which is then stored in a random access memory. A user interface (either a simple manual or voice control) driving a hierarchy of menus allows a user to access the information by indicating his selections from the menus. The system then extracts the information from the database in decrypted form. A speech producing device including a decompression system and a digital to analog converter (D/A) or other speech producing device converts the encrypted digitized audio information to an audio signal for provision to the user via a loud speaker or earphones.

This system may be stand alone or be a part of an existing radio receiver, sharing components of the radio receiver. One embodiment of the user control is a four way switch the positions corresponding for instance to the cursor control keys on a computer) for selection from and scanning through menus listing various categories of information. Typically the system includes either volatile RAM memory or a non-volatile storage medium such as a digital audio tape, a magneto-optical mini-disk, a magnetic disk or optical disk, sufficient to store information for 10 or more hours of audio. The information is for example news, sports, weather, cultural information, advertisements, or commercial listings. The information is transmitted in encrypted digital form using data compression techniques which is readily stored. The use of encryption techniques controls access to the information data base as a whole or to selected parts that the user has contracted for.

Other features are user control over the speed at which the speech is output, and a channel skipping tuner for finding the particular FM radio station subcarrier, TV station vertical interval or TV station SAP channel on which the service is provided. The speech producing device may be under either automatic or user control to produce different speeds of the voices. This control of the speed of the voice could be one that changes the pitch or be one that changes the spacing between words. Also, the user has the opportunity to pre-select database items, thereby to construct a personal profile so as to extract particular information without having to scan through all the menus.

BRIEF DESCRIPTION OF THE DRAWING

These and other features and other aspects of the present invention will become better understood with reference to the following description, appended claims and accompanying drawings where:

DETAILED DESCRIPTION

Figure 1:
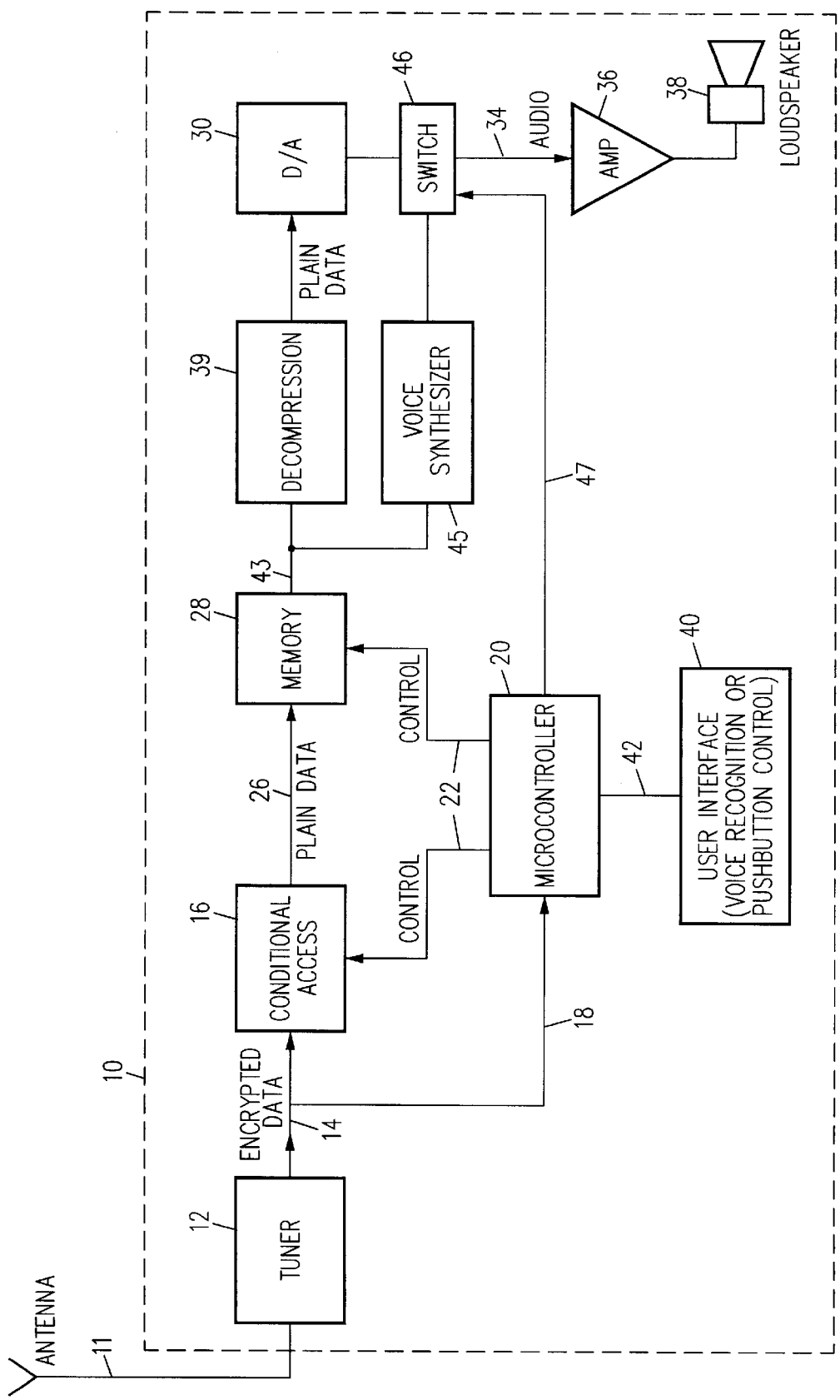
FIG. 1 shows a block diagram of a receiving apparatus in accordance with the present invention.

FIG. 1 shows a device in accordance with one embodiment of the invention. A broadcast signal is received from an antenna 10 (as used in automobile or portable applications) which provides a received radio broadcast signal or television video broadcast signal to a tuner 12. This tuner is either a FM subcarrier tuner of the type well known in the art for extracting an FM broadcast subcarrier signal; a television tuner designed to produce the output of the Vertical Blanking Interval; a Separate Audio Program channel from a television broadcast signal; or a dedicated radio channel. In the case of an FM subcarrier tuner, as is well known, the subcarrier signals are typically transmissions of digitized data on subcarriers leased from commercial FM stations. The Vertical Blanking Interval is already available for point to multipoint transmission. The FM Subcarrier or the TV tuner 12 provides on line 14 the extracted digitized audio (which is typically encrypted) to conditional access circuitry 16.

A receiver sub-system converts digitized and encrypted alphanumeric data on line and compressed digitized audio data 14 from the transmitter to an analog signal representing spoken words. The tuner 12 provides the data to the conditional access system 16 on line 14 and to microcontroller (controller) 20 described below.

Conditional access circuitry 16 ensures that the data is decrypted only if the proper key or command has been provided, as described below. Conditional access circuitry 16 decrypts the received audio data (as authorized by microcontroller 20 over lines 22) on line 26 for storage to the memory 28 which may be conventional integrated circuit random access memory (RAM). In one embodiment the memory 28 comprises volatile RAM memory. In another embodiment memory 28 may consist of a non-volatile storage medium such as a digital audio tape, a magneto-optical mini-disk, a magnetic disk or an optical disk, with sufficient capacity to store information for 10 hours of audio.

Figure 2:
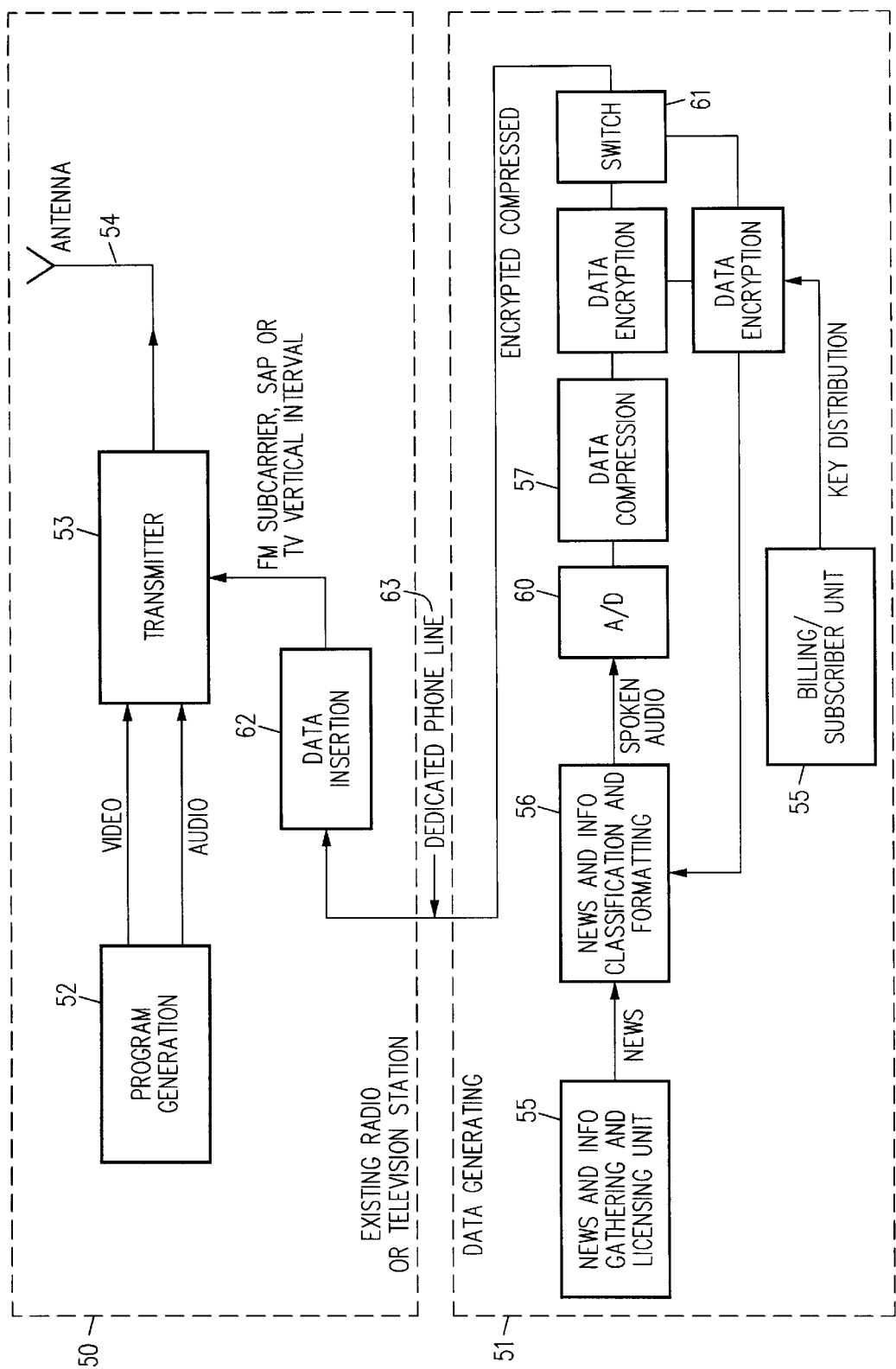
FIG. 2 shows a block diagram of a transmission system in accordance with the present invention.

In order to provide the needed quantity of audio data in a reasonable time frame and to minimize the memory requirement, the original audio data is ideally passed through a data compression algorithm at the transmitting end to compress the data sufficiently for a narrow band data transmission channel. This is shown in FIG. 2, at and will be discussed later. The receiving apparatus has a companion decompression algorithm, 39, at the output of the memory 28 to provide the decompressed audio data to the digital to analog converter 30 for conversion of the digitized audio data to analog audio signals.

The conditional access system 16 and microcontroller 20 are described below. The encrypted compressed data output of the tuner 12 is accessed under control of microcontroller (microprocessor) 20 via control signals at lines 22, to determine which particular items of data stored in memory 28 are to be provided via output line 43 to the decompression circuitry 39 via switch 45.

Much of the data that a user would use in such a system is in alphanumeric form that can be easily transmitted in that form and converted to audio via speech synthesis. Such data can be transmitted in alphanumeric form for bandwidth and speed considerations. In order to accommodate the dual transmission of alphanumeric data as well as audio data, switch 46 controlled by microcontroller 20 determines whether the system is responding to original alphanumeric data or compressed audio data. When alphanumeric data is being transmitted, the alphanumeric data is fed into a speech synthesizer 45 whose audio output is connected to switch 46 for connection of the audio output to audio amplifier 36 and loudspeaker 38.

In other embodiments, the received data is stored as encrypted data or in another convenient form and converted to a form usable by a speech producing device prior to being converted to speech. Each audio data item is "tagged" with an designation to allow retrieval of the stored encrypted audio data from the database.

User interface 40 inputs commands on line 42 to microcontroller 20 to determine which items of data from random access memory 28 are to be listened to.

The transmitted information is categorized, stored, and accessed in a conventional hierarchial database in memory 28 under control of microcontroller 20. A user interface (either a simple manual or voice control) driving a hierarchy of menus allows a user to access the information by indicating his selections from the menus.

In one embodiment user interface 40 is a voice activated command system. For instance the device is turned on and initialized by the user's spoken "ON" command. It then responds by vocally announcing via loud speaker 38 the major database categories available e.g. "NEWS", "SPORTS", "ENTERTAINMENT", etc. When the desired category has been announced the user responds by saying "YES". The device then announces again the sub-categories of the selected major category, and the user again selects the desired sub-category with a spoken "YES" until the specific item needed is accessed. For example, the category and sub-category path to the latest news regarding the General Motors Corporation might be "NEWS . . . BUSINESS . . . NATIONAL . . . AUTOMOTIVE . . . GM." The path to a review of the recent movie Aladdin might be "ENTERTAINMENT . . . HOLLYWOOD . . . MOVIE REVIEWS . . . ALADDIN." Typically items will be reached after four or five "YES" responses from the user. In one embodiment three additional spoken commands by the user such as "BACK" "STOP" and "GO" are sufficient to provide the user effective and rapid control of the system.

In another embodiment a manual input device such as a switch assembly having for instance four positions (up, down, left, right) corresponding to the familiar cursor control on a computer, with each position indicating one of four commands, is provided for user manual operation. This switch may be adapted to attach to the steering wheel of an automobile, for use by the driver. The control is linked to the rest of the device by wire, infrared, or ultrasonically, as is a conventional television remote control.

Another version uses a one-position control switch. The user briefly depresses the switch to select the category or item as announced or to scan through the menus. Briefly depressing the switch while an actual data item is being read executes "stop." Depressing it again then executes "go." Holding the switch down for a second or two executes "back" at any time, to return to a predetermined point in the database.

For full effectiveness the information dissemination device needs to be on 24 hours a day. In order to conserve power the received data could be first stored in random access memory (RAM) which consumes little power and when the RAM is full dumped to a more permanent storage medium such as a digital audio tape, a magneto-optical mini-disk, a magnetic disk or an optical disk, sufficient to store information for 10 hours or more of audio. The speech producing device 30 may be a digital to analog converter that converts digitized and decompressed audio data into understandable and well modulated audio analog signals. The audio analog signals are provided on line 34 to a conventional audio amplifier 36 and hence to a loud speaker or earphones 38 to be listened to by the user. Tuner 12, microcontroller 20, conditional access circuitry 16 and memory 28 typically remain powered at all times (by battery power if necessary) to receive a continuous update of the broadcast database, and thereby to store current news in memory 28.

When using the Vertical Blanking Interval, it is possible to transmit at a rate of 2 megabits per second on 6 Vertical Blanking Interval lines each with a 50 microseconds duration to provide a 24,000 bit per second channel with a 50% error correction overhead. In one version the device of FIG. 1 is a portable unit (similar to a portable radio) and includes the user voice or manual interface. In another embodiment the device of FIG. 1 is built into a conventional portable radio or automobile radio, sharing where possible common components.

In one embodiment user interface 40 has a speed control to determine the output speed of speech output. The Digital to analog converter 30 or the Speech synthesizer 45 may receive information faster than normal speaking speed. It is well known that people can understand speech at faster than normal speech rates. Thus the user by pushing a button on the receiver unit or providing the proper verbal command increases the speech speed, so as to obtain information faster, analogous to skimming printed material. This speeding up can use well known techniques that change the pitch or eliminate the gaps between words. A similar slowing down approach can be used in case the user wants to carefully note what is being said for example while taking notes.

In the embodiment using a voice activated user interface 40, the number of commands provided is limited (for instance to 5 to 10) and hence a relatively simple commercially available voice input recognition circuit is sufficient.

In another embodiment, the user interface for an automobile-based system is associated with a heads-up display, expected to be available in various automobiles in the near future. This provides visual display of the database menu items analogous to a computer screen, to allow faster access to the database menus.

Advantageously, by transmitting and storing the audio data in a compressed form (even though encrypted), the required bandwidth of the transmission channel is vastly reduced, as are the memory requirements, thereby substantially reducing the component cost. When used in FM subcarrier transmission, the typical transmission speed is one kilobaud. This is sufficient to download in approximately one hour the needed data to memory 28.

In use, after purchase of the unit the user programs it to the frequencies of the local stations providing he transmissions. There may be multiple such stations in one area, due to the limited transmission distance of FM radio and TV signals. A channel skipping feature (as is now available commercially in various radios) in one embodiment included in microcontroller 20 seeks out stations having a particular signature or frequency, to maintain reception even when moving from the transmission area of one station carrying the service to the transmission area of a second station carrying the service. It would take less than a minute for the system to scan the entire FM band or TV band looking for the signature transmission.

The data encryption/access is accomplished in several ways. In one embodiment a simple addressed on/off command is transmitted (without data encryption) to disable individual units belonging to people who have not paid the required monthly subscription fee to receive the service. The encryption can be used to provide access to the entire data base or to individual parts of the data base.

In a more sophisticated encryption system where it is believed there is a problem of manufacture and sale of unauthorized units, then proper data encryption is used, requiring receipt of a key and decryption of the data with decryption circuitry. Hence unauthorized units without such dedicated decryption circuitry would not be operative at all.

In one embodiment of an encryption system, (analogous to pay-per-view cable TV encryption), decryption keys are delivered by radio transmission. Each individual receiver unit has a unique "hidden" key of for instance 40 to 50 binary digits in read only memory. Each unit also has a "public" non hidden serial number. All transmitted data is conventionally encrypted using a master key which is changed periodically, both to force users to pay for the service and to enhance security. Each receiver unit must receive a master key to decrypt the data transmission.

The master key is transmitted to each unit as follows:

Periodically, the transmission of the data is interrupted to transmit key information. The key information is a series of packets, one packet for each individual receiver unit, with each packet including (1) an address field which is the public serial number of a particular unit; followed by (2) a second field which is the current master key encrypted with the unique "hidden kev" of the unit having that particular serial number.

The receivers look for these packets (which are denoted by a particular signature or occur at particular times to avoid confusion with the data). When a particular unit receives the packet including its own address (public serial number), it stores and decrypts the subsequent encrypted master key field, thereby obtaining the master key, in order to decrypt subsequent encrypted data.

In a second encryption system embodiment, a uniquely encrypted master key for each individual receiver is physically delivered to each user periodically (such as once a month) The key could be entered into each unit by a keypad, or the key could be embodied in an electronically readable card or device inserted into a suitable port in the receiver.

In another embodiment, speech output device 30 is controlled to provide a variety of particular voices. These voices are selected by the user, i.e. to be male/female or other voices, or the system is programmed via microcontroller 20 to select different voices for different types of or categories of information.

The device of FIG. 1 as incorporated in a conventional radio or television receiver uses the antenna of the radio or television receiver. The tuner 12 may be in addition to the conventional radio or television tuner or could be part of the radio or television tuner. The other blocks of FIG. 1 (with the exception of amplifier 36 and loud speaker 38) are unique to this system and are added components to a conventional radio or television receiver.

Another embodiment may encompass all of the elements of the receiver except the control and audio in a device stored in the trunk of an automobile similar to CD music systems with an output mini radio transmitter tuned to an unused FM or AM radio channel. This radio transmitter output would be coupled to the standard automobile radio antenna for outputting of the audio signal to the user.

Another embodiment of the receiver may provide for the reception and storage of the received data on a home base unit wherein the received data is stored on disk storage as discussed above and the disk is played back on the portable automobile unit. A further embodiment of this feature could encompass a home base unit containing all the features of an automobile unit and can be unplugged from the home base and plugged into the automobile unit for continuing use while the user is in the automobile.

The transmitting portion of the system is described in FIG. 2 indicating the following steps. The Data Generating portion 51 contains the usual human elements of News and Information Gathering step 55 with the News and Information Classified and formatted step 56, i.e. a data producing sub-system. For the audio transmission, this news and information is spoken into the electronics portions beginning with the A/D convertor 60 which converts the analog audio signals to a digital audio. The digitized audio is compressed for bandwidth considerations in data compressor 57. The compressed digitized audio is encrypted in encryptor 58 according to instructions from a Billing/Subscriber system 59. The Encrypted digital audio establishes a data base of digitized audio data.

When it is advantageous to use alphanumeric information, the alphanumeric information is put in a form for transmission and encrypted. Switch 61 which can be controlled by an operator determines whether the system transmits compressed digitized audio or alphanumeric information. The Data is sent by a transmission path such as a dedicated telephone line 63 to a transmission station such as an existing radio and television station. 50 In order to provide the needed quantity of audio data in a reasonable time frame the audio data must be passed through a data compression algorithm at the transmitting end to compress the audio data sufficiently for a narrow band data transmission channel. This is shown as 57 in FIG. 2.

In addition to data compression, since the transmission facility is not transmitting the information in a "live" fashion as with most broadcasting facilities, it can maximize the use of the available bandwidth of transmission by not only using the above mentioned data compression techniques, but can transmit the data at a rate unrelated to the speed of speech. The speed of transmission of the data can be faster than the "real time" speech when bandwidth considerations permit. In addition, the speed of transmission can be slower than the "real time" speech if a narrower bandwidth is available. This variation in transmission speed affects the time required to transmit a given amount of information. The completed data is inserted into the FM subcarrier, Separate Audio Program channel or the television vertical interval according to the type of transmission channel chosen using a data insertion device.

In order to accommodate the fact that some subscribers may not have their units on when certain data is transmitted, it is apparent that the sending facility will need to update the data base from time to time during the day even if no new information has been generated. The data for a particular story or article will need to have a date stamp to indicate to the user the currency of the information. These and other logistical features will become apparent with the use of the system.

The above description is illustrative and not limiting; further modifications will be apparent to one of ordinary skill in the art.

I claim:

1. A method for receiving and storing audio for subsequent playback, comprising the acts of:

providing a tuner to receive television signals;

receiving the television signals including audio at the tuner, wherein the audio is carried in the vertical blanking interval of the television signals;

storing the received audio in a memory;

associating a designation with the stored audio;

associating a menu selection with the designation;

presenting a menu that includes the menu selection;

using the designation to access the stored audio in response to the menu selection being selected on the menu; and outputting the accessed audio.

2. The method of claim 1, wherein the audio is digitized.

3. The method of claim 1, wherein the audio is compressed.

4. The method of claim 1, wherein the audio is stored as a database.

5. The method of claim 1, wherein the menu is included in a set of hierarchical menus.

6. A method for receiving and storing audio for subsequent playback, comprising the acts of:

providing a tuner to receive television signals;

receiving the television signals including audio at the tuner, wherein the audio is carried in an SAP associated with the television signals;

storing the received audio in a memory;

associating a designation with the stored audio;

associating a menu selection with the designation;

presenting a menu that includes the menu selection;

using the designation to access the stored audio in response to the menu selection being selected on the menu; and outputting the accessed audio.

7. The method of claim 6, wherein the audio is digitized.

8. The method of claim 6, wherein the audio is compressed.

9. The method of claim 6, wherein the audio is stored as a database.

10. The method of claim 6, wherein the menu is included in a set of hierarchical menus.

11. A method for receiving and storing audio for subsequent playback, comprising the acts of:

providing a tuner to receive television signals;

receiving the television signals including audio at the tuner, wherein the audio is carried in an FM subcarrier associated with the television signals;

storing the received audio in a memory;

associating a designation with the stored audio;

associating a menu selection with the designation;

presenting a menu that includes the menu selection;

using the designation to access the stored audio in response to the menu selection being selected on the menu; and outputting the accessed audio.

12. The method of claim 11, wherein the audio is digitized.

13. The method of claim 11, wherein the audio is compressed.

14. The method of claim 11, wherein the audio is stored as a database.

15. The method of claim 11, wherein the menu is included in a set of hierarchical menus.

16. A method for receiving and storing audio for subsequent playback, comprising the acts of:

providing a tuner to receive television signals;

receiving the television signals including audio at the tuner;

storing the received audio in a memory, wherein the audio is stored as a database;

associating a designation with the stored audio;
associating a menu selection with the designation;
presenting a menu that includes the menu selection;
using the designation to access the stored audio in response to the menu selection being selected on the menu; and
outputting the accessed audio.

17. The method of claim 16, wherein the audio is digitized.

18. The method of claim 16, wherein the audio is compressed.

19. The method of claim 16, wherein the menu is included in a set of hierarchical menus.

20. A method for receiving and storing audio for subsequent playback, comprising the acts of:
providing a tuner to receive television signals;
receiving the television signals including audio at the tuner, wherein the audio is carried in an audio or video portion of the television signals;
storing the received audio in a memory;
associating a designation with the stored audio;
associating a menu selection with the designation;
presenting a menu that includes the menu selection;
using the designation to access the stored audio in response to the menu selection being selected on the menu; and
outputting the accessed audio.

21. The method of claim 20, wherein the audio is digitized.

22. The method of claim 20, wherein the audio is compressed.

23. The method of claim 20, wherein the audio is stored as a database.

24. The method of claim 20, wherein the menu is included in a set of hierarchical menus.

25. A receiver comprising:
a television tuner;
a controller coupled to the television tuner and which provides audio from a signal received at the television tuner, wherein the audio is carried in the vertical blanking interval of television signals received at the tuner;
a memory coupled to the controller and which stores the audio;
a user interface coupled to the controller and which provides a menu; and
an audio output device coupled to the controller and which outputs the stored audio in response to a selection from the menu, wherein the stored audio has a designation associated with the menu.

26. The receiver of claim 25, wherein the audio is digitized.

27. The receiver of claim 25, wherein the audio is compressed.

28. The receiver of claim 25, wherein the audio is stored as a database.

29. The receiver of claim 25, wherein the menu is included in a set of hierarchical menus.

30. A receiver comprising:
a television tuner;
a controller coupled to the television tuner and which provides audio from a signal received at the television tuner, wherein the audio is carried in an SAP associated with television signals received at the tuner;
a memory coupled to the controller and which stores the audio;
a user interface coupled to the controller and which provides a menu; and
an audio output device coupled to the controller and which outputs the stored audio in response to a selection from the menu, wherein the stored audio has a designation associated with the menu.

31. The receiver of claim 30, wherein the audio is digitized.

32. The receiver of claim 30, wherein the audio is compressed.

33. The receiver of claim 30, wherein the audio is stored as a database.

34. The receiver of claim 30, wherein the menu is included in a set of hierarchical menus.

35. A receiver comprising:
a television tuner;
a controller coupled to the television tuner and which provides audio from a signal received at the television tuner, wherein the audio is carried in an FM subcarrier associated with television signals received at the tuner;
a memory coupled to the controller and which stores the audio;
a user interface coupled to the controller and which provides a menu; and
an audio output device coupled to the controller and which outputs the stored audio in response to a selection from the menu, wherein the stored audio has a designation associated with the menu.

36. The receiver of claim 35, wherein the audio is digitized.

37. The receiver of claim 35, wherein the audio is compressed.

38. The receiver of claim 35, wherein the audio is stored as a database.

39. The receiver of claim 35, wherein the menu is included in a set of hierarchical menus.

40. A receiver comprising:
a television tuner;
a controller coupled to the television tuner and which provides audio from a signal received at the television tuner;
a memory coupled to the controller and which stores the audio, wherein the audio is stored as a database;
a user interface coupled to the controller and which provides a menu; and
an audio output device coupled to the controller and which outputs the stored audio in response to a selection from the menu, wherein the stored audio has a designation associated with the menu.

41. The receiver of claim 40, wherein the audio is digitized.

42. The receiver of claim 40, wherein the audio is compressed.

43. The receiver of claim 40, wherein the menu is included in a set of hierarchical menus.

44. A receiver comprising:
a television tuner;
a controller coupled to the television tuner and which provides audio from a signal received at the television tuner, wherein the audio is carried in an audio or video portion of television signals received at the tuner;
a memory coupled to the controller and which stores the audio;

a user interface coupled to the controller and which provides a menu; and an audio output device coupled to the controller and which outputs the stored audio in response to a selection from the menu, wherein the stored audio has a designation associated with the menu.

45. The receiver of claim 44, wherein the audio is digitized.

46. The receiver of claim 44, wherein the audio is compressed.

47. The receiver of claim 44, wherein the audio is stored as a database.

48. The receiver of claim 44, wherein the menu is included in a set of hierarchical menus.

* * * * *